United States Patent [19]

Asanuma et al.

[11] Patent Number: 4,742,131

[45] Date of Patent: May 3, 1988

[54] METHOD OF CONTROLLING POLYMERIZATION TEMPERATURE

[75] Inventors: Tadashi Asanuma; Mitsuru Ito; Kaneo Ito; Yoshiyuki Funakoshi; Akihiko Nakajima, all of Takaishi, Japan

[73] Assignee: Mitsui Toatsu Chemicals, Incorporated, Tokyo, Japan

[21] Appl. No.: 939,690

[22] Filed: Dec. 9, 1986

[30] Foreign Application Priority Data

Dec. 27, 1985 [JP] Japan .................... 60-295281
Dec. 27, 1985 [JP] Japan .................... 60-295280

[51] Int. Cl.⁴ ............................... C08F 2/02
[52] U.S. Cl. .................... 526/61; 526/68; 526/351; 526/59; 526/902; 422/138
[58] Field of Search ........... 526/59, 68, 351, 61; 422/138

[56] References Cited

U.S. PATENT DOCUMENTS

| | | | |
|---|---|---|---|
| 3,013,004 | 12/1961 | Koble et al. | 526/59 |
| 4,024,329 | 5/1977 | Lauer et al. | 526/61 |
| 4,061,848 | 12/1977 | Sistig et al. | 526/68 X |
| 4,408,024 | 10/1983 | Matsuyama et al. | 526/67 |
| 4,442,271 | 4/1984 | Rau et al. | 526/68 X |
| 4,657,994 | 4/1987 | Tanaka et al. | 526/67 X |

FOREIGN PATENT DOCUMENTS 0201801 11/1983 Japan .................. 526/68

Primary Examiner—Joseph L. Schofer
Assistant Examiner—F. M. Teskin
Attorney, Agent, or Firm—Oblon, Fisher, Spivak, McClelland & Maier

[57] ABSTRACT

Disclosed herein is a method for controlling the polymerization temperature in a polymerization apparatus equipped with a cooling system in which steam, which has occurred in the presence of a volatile liquid medium in a reaction system, is condensed in a reflux condenser and the resulting noncondensable gas and condensate are then returned to the reaction system, thereby removing the polymerization heat. A portion of the noncondensable gas is recirculated to the cooling system. The flow rate of the noncondensable gas to be recirculated and the flow rate of a cooling medium to be introduced into the reflux condenser are controlled in accordance with the temperature of the reaction system.

4 Claims, 4 Drawing Sheets

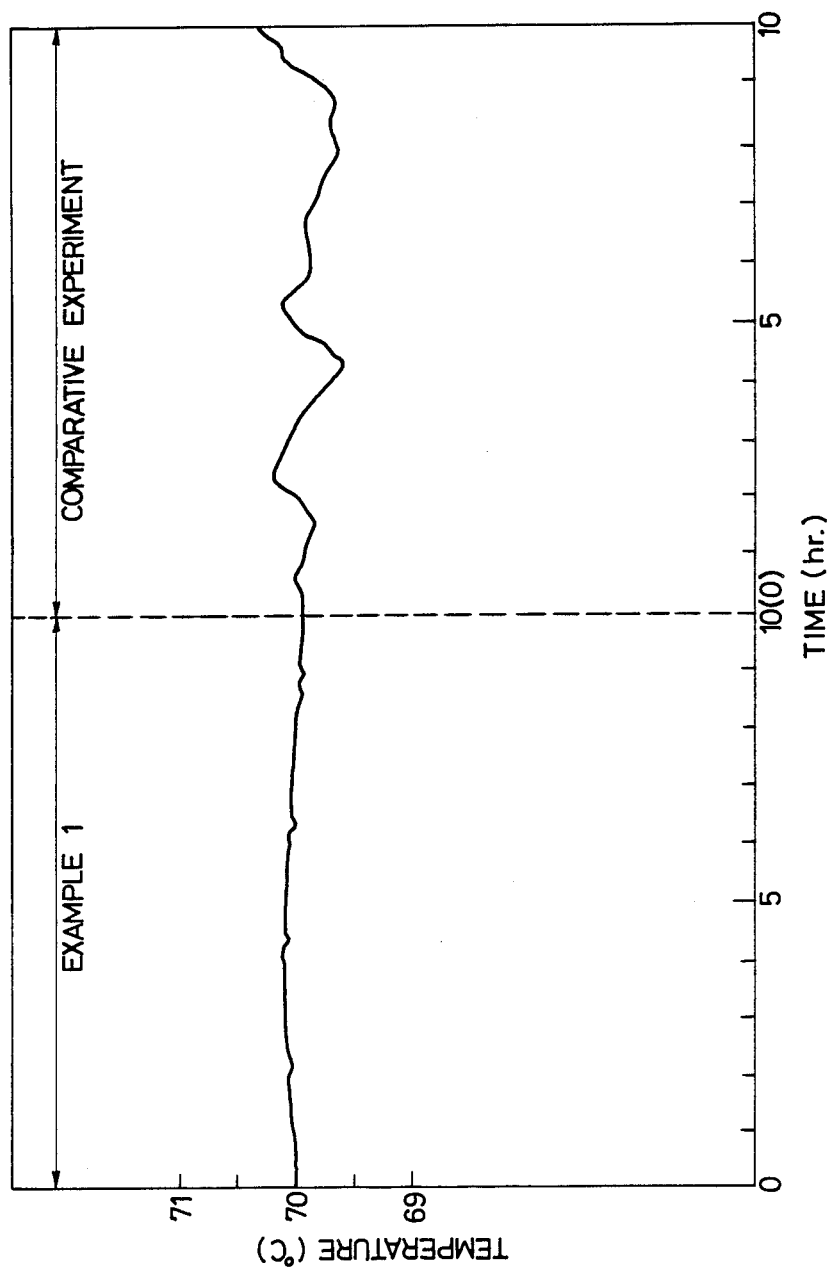

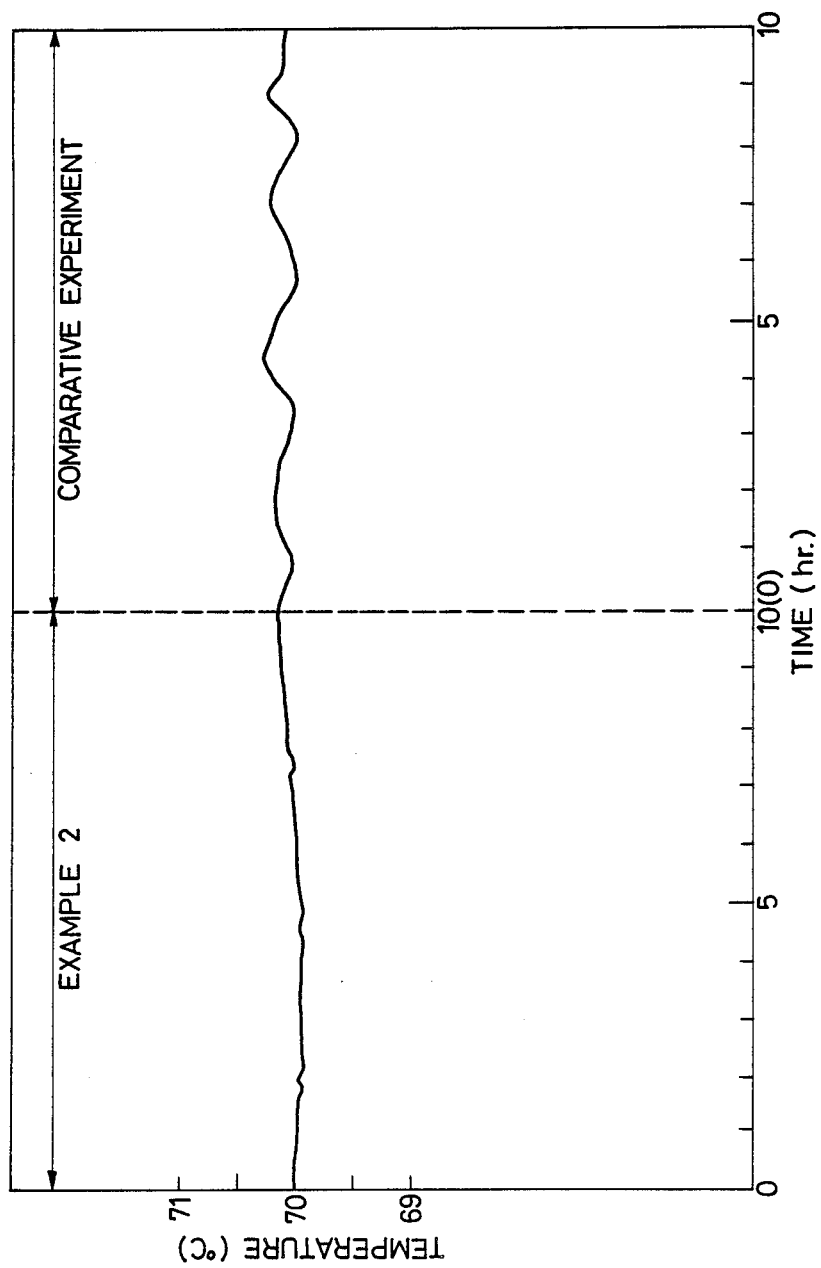

4,742,131

METHOD OF CONTROLLING POLYMERIZATION TEMPERATURE

BACKGROUND OF THE INVENTION (a) Field of the Invention

This invention relates to a method for the removal of polymerization heat upon production of a polymer by polymerizing one or more monomers, and more specifically to a method for controlling such polymerization heat by cooling and condensing steam occurred in a reactor.

(b) Prior Art of the Invention

It is extremely important to maintain the polymerization temperature at a predetermined level by removing polymerization heat which occurs during a polymerization reaction. It has been known to remove such polymerization heat through the wall of a reactor or by means of a heat exchanger provided inside the reactor. Since the above methods do not allow to establish a large heat transfer area in the case of a large reactor, it has also been proposed to employ a reflux condenser which makes use of latent heat of a liquid medium. It has been disclosed in Japanese Patent Publication No. 45961/1983 that a reflux condenser features large cooling capacity and can remove polymerization heat with good responsiveness if certain specific control variables are employed.

Even if the above-described method is used, it is technically difficult to control the polymerization temperature constant by changing the flow rate of a cooling medium because the quantity of heat which must be removed by a reflux condenser is enormous in a large reactor. It has been extremely difficult to solve this problem even if a special design is elaborated to provide several cooling medium flow lines having different flow rates and to control the flow rate(s) of the cooling medium through flow line(s) having smaller flow rates to cope with small variations in the quantity of heat to be removed.

SUMMARY OF THE INVENTION

The present inventors have carried out an extensive investigation with a view toward finding a method for solving the above-described problems. As a result, it has been found that a polymerization reaction can be conducted at a constant temperature by controlling the flow rate of a fluid in a cooling system and removing the polymerization heat with extremely good controllability, leading to completion of this invention.

In one aspect of this invention, there is thus provided a method for controlling the polymerization temperature in a polymerization apparatus equipped with a cooling system in which steam, which has occurred in the presence of a volatile liquid medium in a reaction system, is condensed in a reflux condenser and the resulting noncondensable gas and condensate are then returned to the reaction system, thereby removing the polymerization heat. A portion of the noncondensable gas is recirculated to the cooling system, and the flow rate of the noncondensable gas to be recirculated and the flow rate of a cooling medium to be introduced into the reflux condenser are controlled in accordance with the temperature of the reaction system.

BRIEF DESCRIPTION OF THE DRAWINGS

FIG. 3 is a graph showing, together with results of a comparative experiment, the relation between operation time and reaction temperature when polymerization was conducted in Example 1; and FIG. 4 is a graph showing, together with results of another comparative experiment, the relation between operation time and reaction temperature when polymerization was conducted in Example 2.

DETAILED DESCRIPTION OF THE INVENTION

Figure 1:
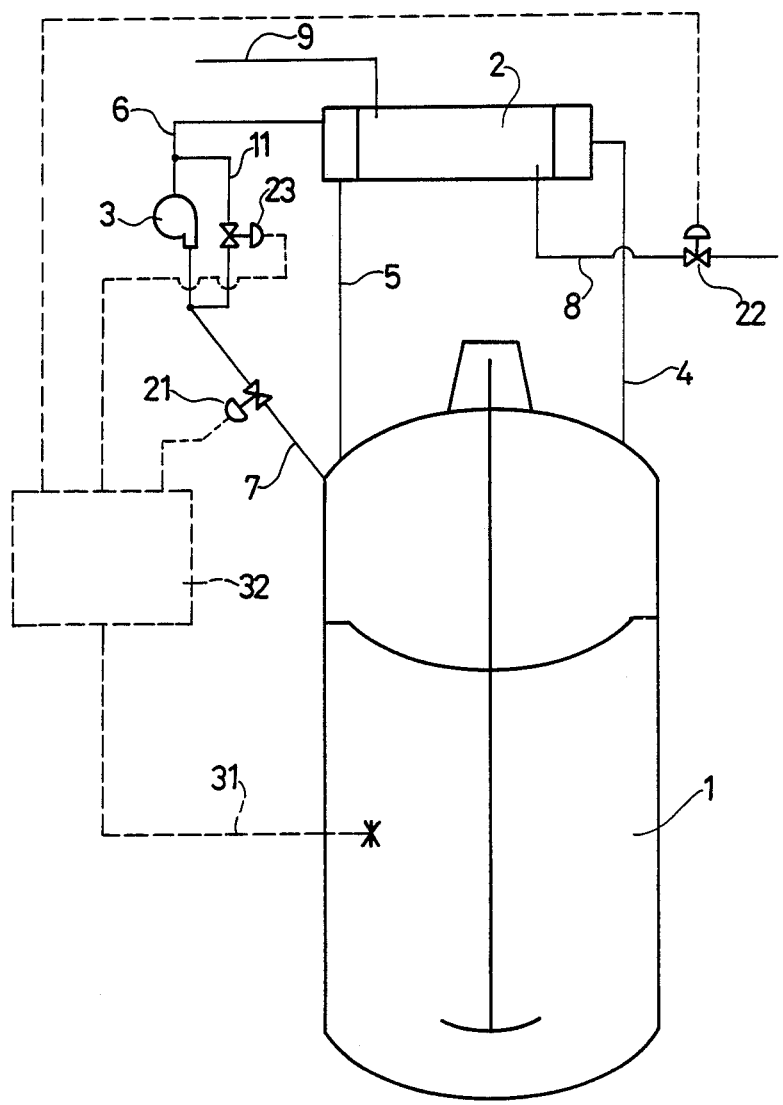
FIG. 1 illustrates one example of polymerization apparatus useful in the practice of the method of this invention, in which a portion of noncondensable gas is returned to a noncondensable gas discharge line extending from a reflux condenser so as to recirculate said portion of the noncondensable gas.

The control method of this invention can be applied to any polymerization of any monomer so long as the polymerization is conducted using a reactor equipped with a reflux condenser. The control method of this invention is particularly effective when it is applied to a polymerization reaction which is conducted by a bulk polymerization technique while using as a volatile liquid medium a monomer to be polymerized, because a great deal of polymerization heat can be removed through a reflux condenser.

The term "volatile liquid medium" as used herein include, for example, hydrocarbons such as propane, pentane, hexane, heptane, decane, benzene and toluene, halogenated hydrocarbons such as 2-dichloroethane, etc.

As monomers usable in the polymerization, may be mentioned those containing double bonds polymerizable through addition reactions and having relatively great polymerization heat, such as propylene, vinyl chloride, vinylidene chloride, butene-1, hexene-1, styrene and p-methylstyrene. The method of this invention can also be applied when two or more of the above monomers are copolymerized or one or more of the above monomers are subjected to a copolymerization reaction with ethylene.

Further, the method of this invention can be applied whether the polymerization reaction is batchwise or continuous. It is however particularly effective when the method of this invention is applied to a continuous polymerization reaction in which variations in the generation pattern of polymerization heat are difficult to predict.

Embodiments of this invention will hereinafter be described with reference to the accompanying drawings.

A description will be made, first of all, of the use of the apparatus shown in FIG. 1, in which a portion of the aforementioned noncondensable gas is returned to a noncondensable gas discharge line extending from a reflux condenser so as to recirculate same.

A monomer is polymerized in the presence of a volatile liquid medium in a polymerization tank 1. Vapor of the volatile liquid medium, which has been heated by the polymerization heat, is introduced into a reflux condenser 2 by way of a line 4. A cooling medium is introduced from a line 8 via a flow control valve 22 into the reflux condenser 2 and is discharged through a line 9, thereby condensing the vapor. The resultant condensate is returned to the reaction tank 1 through a line 5, whereas noncondensable gas which has not been condensed is compressed by a blower 3 and a portion of the noncondensable gas is returned via a flow control valve 21 through a line 7 to the reaction tank 1 and the remainder is returned via a flow control valve 23 through a line 11 to a line 6. By a controller 32, the flow control valves 21,22,23 are respectively controlled in accordance with data detected by a thermometer (primary means) 31. In the above-described apparatus, other mechanical transfer means, for example, various compressors may be used in place of the blower 3.

A variety of known methods may be applied to control the flow control valves 21,22,23 which are operated in accordance with the temperature detected by the thermometer 31. Although no particular limitation is imposed on servo mechanisms for driving the flow control valves, the conversion method of signals, which are proportional to temperatures, into signals to be fed to the servo mechanisms, or the computing method, the flow control valves 21,22,23 are usually controlled in such a manner that a threshold is established as to variations of the temperature in the polymerization tank, and temperature variations are dealt with by operating the control valves 21,23 when they are smaller than the threshold but by the control valve 22 when they are not smaller than the threshold. Substantial variations in the quantity of heat to be removed are dealt with primarily by changing the flow rate of the cooling medium, while small variations in the quantity of heat to be removed are dealt with by changing the flow rate of the noncondensable gas.

The control method of the control valves in the present invention will next be described in further detail. Normally, the opening degree of each of the valves is controlled by combining a function proportional to the difference from a preset value, another function obtained by differentiating the difference from the preset value with respect to time and a further function obtained by integrating the difference from the preset value. It is not specified which one or two of the above three functions weight should be given to, because it depends on each apparatus and each polymerization system. However, the valve 23 is solely controlled when the difference from the preset value is smaller than a predetermined value and the absolute value of the differentiated value is also smaller than a preset value. The valve 22 is however controlled when the absolute value of the differentiated value is the preset value or greater. When the differentiated value becomes smaller than a predetermined value, the valve 23 is controlled while maintaining the opening degree of the valve 22 constant. Here, the control function of the opening degree of each valve corresponding to temperature variations may also be changed in accordance with the above-mentioned integrated values for a given period of time. The valve 23 may be maintained at the constant opening degree as is, may be held at the middle of the variation range, or may be interlocked with the valve 22 and closed. It is also possible to open the valve 23 so as to absorb a portion of variations in the quantity of heat to be removed, which variations are caused by variations of the valve 22. The control method of the control valves can be determined in accordance with control characteristics of the reactor.

A description will next be made of the use of the apparatus shown in FIG. 2, in which a further portion of the aforementioned noncondensable gas is returned to an introduction line of resulting steam to the reflux condenser.

A monomer is polymerized in the presence of a volatile liquid medium in the polymerization tank 1. Vapor of the volatile liquid medium, which has been heated by the polymerization heat, is introduced into the reflux condenser 2 by way of the line 4. Vapor is condensed by introducing a cooling medium from the line 8 via the flow control valve 22 into the reflux condenser 2 and then discharging same through the line 9.

The resultant condensate is returned to the reaction tank 1 through the line 5, whereas noncondensable gas which has not been condensed is compressed by the blower 3 and a portion of the noncondensable gas is returned via the flow control valve 21 through the line 7 to the reaction tank 1. The above-described structure is the same as that depicted in FIG. 1. The remainder of the noncondensable gas is introduced via a flow control valve 24 through a line 12 into the line 4 or via the flow control valve 23 through the line 11 into the noncondensable gas discharge line 6 extending from the reflux condenser 2. By the controller 32, the flow control valves 21,22,23,24 are respectively controlled in accordance with data output from the thermometer 31 which detects the temperature of the polymerization tank 1.

A variety of known methods may be applied to control the flow control valves 21,22,23,24 which are operated in accordance with the temperature detected by the thermometer 31. Although no particular limitation is imposed on servo mechanisms for driving the flow control valves, the conversion method of signals, which are proportional to temperatures, into signals to be fed to the servo mechanisms, or the computing method, the flow control valves 21,22,23,24 are usually controlled in such a manner that a threshold is established as to variations of the temperature in the polymerization tank, and temperature variations are dealt with by operating the control valves 21,24,23 when they are smaller than the threshold but by operating the control valve 22 in a manner interlocked with the control valve 21,24 and/or 23 when they are not smaller than the threshold.

Figure 2:
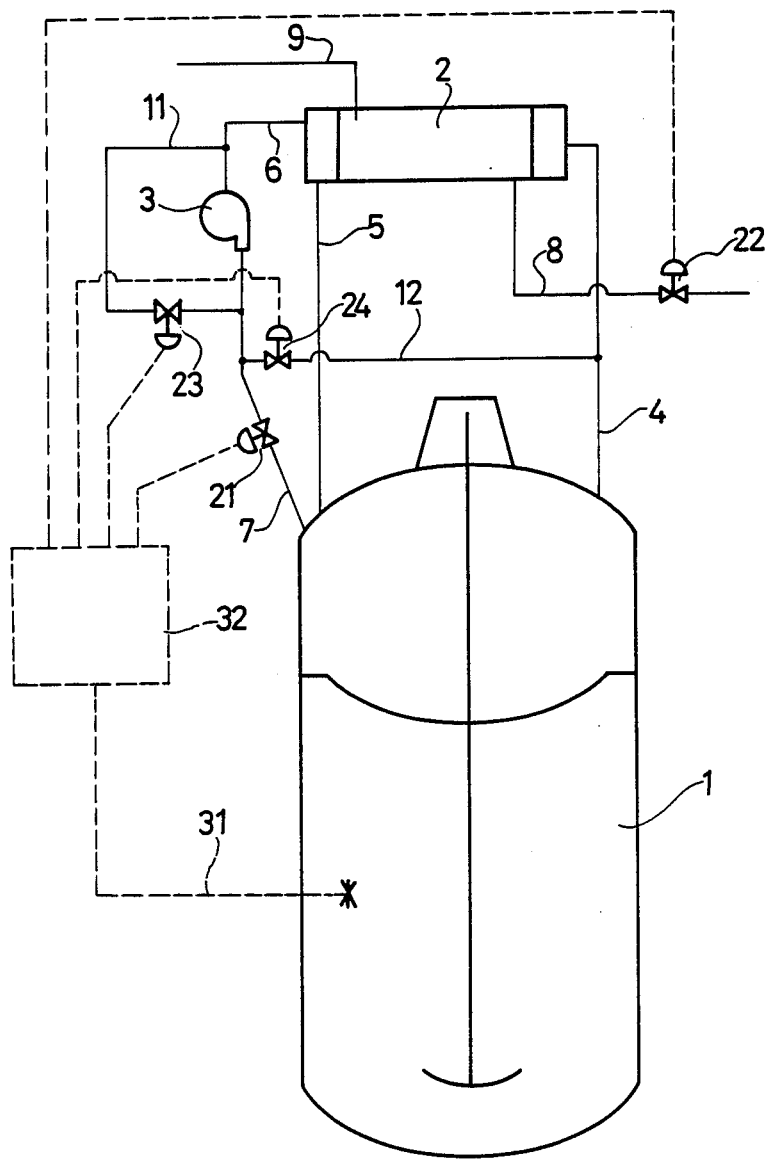
FIG. 2 shows another example of polymerization apparatus useful in the practice of the method of this invention, in which a further portion of the noncondensable gas is also returned to an introduction line of resulting steam to the reflux condenser.

In the apparatus illustrated in FIG. 2, the control effected through the valve 21 in the apparatus depicted in FIG. 1 is carried out by using the three control valves 24,23,21. The control is generally carried out in two ways, i.e., by giving precedence to the control by the valve 21 or to the interlocked control by the valves 23,24. It is dependent on the shape of a reactor, the temperature of a cooling medium, the temperature of the reactor or the like to which one of the controls precedence should be given. When the temperature difference between the cooling medium and the reactor is large for example, better controllability may be achieved in many instances by effecting the control through the valves 23,21 in an interlocked fashion. Where a relatively large amount of noncondensable gas is involved, better controllability may be obtained in many cases by conducting the control through the valve 24.

Substantial variations in the quantity of heat to be removed are dealt with primarily by changing the flow rate of the cooling medium, while small variations in the quantity of heat to be removed are dealt with by changing the flow rate of the noncondensable gas.

The control method of the control valves in the apparatus shown in FIG. 2 will next be described in further detail. Normally, like the control valves in the apparatus depicted in FIG. 1, the opening degree of each of the valves is controlled by combining a function proportional to the difference from a preset value, another function obtained by differentiating the difference from the preset value with respect to time and a further function obtained by integrating the difference from the preset value. It is not specified which one or two of the above three functions weight should be given to, because it depends on each apparatus and each polymerization system. However, the valve 24 is solely controlled when the difference from the preset value is smaller than a predetermined value and the absolute value of the differentiated value is also smaller than a preset value. The valve 22 is however controlled when the absolute value of the differentiated value is the preset value or greater. When the differentiated value becomes smaller than a predetermined value, the valve 24 is controlled while maintaining the opening degree of the valve 22 constant. Here, the control function of the opening degree of each valve corresponding to temperature variations may also be changed in accordance with the above-mentioned integrated values for a given period of time. The valve 24 may be maintained at the constant opening degree as is, may be held at the middle of the variation range, or may be interlocked with the valve 22 and closed. It is also possible to open the valve 22 so as to absorb a portion of variations in the quantity of heat to be removed, which variations are caused by variations of the valve 22. The control method of the control valves can be determined in accordance with control characteristics of the reactor.

The polymerization temperature can be controlled with good controllability by removing the polymerization heat in accordance with the method of this invention, because a fine control seems to be feasible as to the amount of vapor to be introduced into the reflux condenser, in other words, as to the amount of vapor to be condensed (namely, the quantity of heat to be removed seems to be controllable finely) by controlling the amount of noncondensable gas which is not condensed in the reflux condenser.

According to the method of this invention, the controllability of the temperature of a polymerization reaction in a reactor is extremely high so that the polymerization reaction can be effected at a constant temperature. It is hence possible to produce polymers of uniform quality, even when the polymers are polyvinyl chloride, polypropylene and the like the quality of which changes considerably by their polymerization temperatures. In bulk polymerization, temperature variations cause problems as to the transfer of a slurry or the like because the temperature variations result directly in variations in pressure. The method of this invention can solve such problems. It has an extremely high value as a method for practising bulk polymerization on an industrial scale.

The present invention will next be described in more detail on the basis of the following Examples.

EXAMPLE 1

Bulk polymerization of liquid propylene was continuously conducted in the presence of a catalyst composed of titanium trichloride and diethylenealuminum chloride in a polymerization tank having the temperature control system depicted in FIG. 1 and an internal capacity of 40 m$^3$, while using the liquid propylene as a liquid medium too.

The polymerization tank was covered by a jacket which can be cooled (maximum quantity of removable heat: 600 Mcal/hr). A portion of the polymerization heat was removed by introducing cooling water of a substantially constant temperature as a cooling medium into the jacket. A reflux condenser (maximum quantity of removable heat: 2,000 Mcal/hr) such as that shown in FIG. 1 was also employed to control the temperature of the polymerization tank.

The continuous polymerization was effected while controlling the polymerization tank to hold about 30 m$^3$ of a slurry therein and charging the catalyst at a rate of 1.2 kg/hr in terms of titanium trichloride so as to produce polypropylene at a rate of 24 tons/hr. During the operation, hydrogen gas was also charged into the polymerization tank at a rate sufficient to maintain the hydrogen concentration at 7% in the vapor phase so that the molecular weight of polypropylene to be obtained was controlled.

The polymerization was conducted for 10 hours under the above-described conditions while controlling the polymerization temperature at 70° C. For the sake of comparison, an additional operation was also conducted by a conventional method in which the control valve 23 was closed but the control valve 21 was opened. FIG. 3 illustrate temperature variations during the 10-hrs operations. In the Comparative Experiment, the temperature varied considerably. When the temperature was low, i.e, the pressure was low, it was difficult to discharge the slurry from the polymerization tank. When the temperature, i.e., the pressure was high on the other hand, more slurry was discharged. It was hence difficult to maintain the volume of the slurry at the constant level. Moreover, the stereoregularity of the resultant polypropylene was poor.

In the present Example, the control of the control valves 21, 22, 23 in accordance with detected temperatures were effected in the following manner.

A polymerization tank temperature, which had been detected by the thermometer 31, was controlled with a preset temperature of 70° C. at the controller 32. The opening degree of the control valve 23 was reduced further when the above-detected temperature was higher than the preset temperature and the rate of variation of the polymerization tank temperature is not greater than a threshold. When the rate of variation of the polymerization tank temperature was greater than the above threshold on the other hand, the opening degree of the control valve 22 was increased and that of the control valve 23 was also controlled.

When the polymerization tank temperature was lower than the preset temperature on the other hand, the respective control valves were operated in a manner opposite to the above-described manner.

In addition, the stability of the control system was enhanced by feedback-controlling the control valve 21 in accordance with a function of the rate of temperature changes upon processing the rate of each change of the polymerization tank temperature at the controller 32.

EXAMPLE 2

Bulk polymerization of liquid propylene was continuously conducted in the presence of a catalyst composed of titanium trichloride and diethylenealuminum chloride in a polymerization tank having the temperature control system depicted in FIG. 2 and an internal capacity of 40 m$^3$, while using the liquid propylene as a liquid medium too.

The polymerization tank was covered by a jacket which can be cooled (maximum quantity of removable heat: 600 Mcal/hr). A portion of the polymerization heat was removed by introducing cooling water of a substantially constant temperature as a cooling medium into the jacket. A reflux condenser (maximum quantity of removable heat: 2,000 Mcal/hr) such as that shown in FIG. 1 was also employed to control the temperature of the polymerization tank.

The continuous polymerization was effected while controlling the polymerization tank to hold about 30 m³ of a slurry therein and charging the catalyst at a rate of 1.2 kg/hr in terms of titanium trichloride so as to produce polypropylene at a rate of 24 tons/hr. During the operation, hydrogen gas was also charged into the polymerization tank at a rate sufficient to maintain the hydrogen concentration at 7% in the vapor phase so that the molecular weight of polypropylene to be obtained was controlled.

The polymerization was conducted for 10 hours under the above-described conditions while controlling the polymerization temperature at 70° C. For the sake of comparison, an additional operation was also conducted by a conventional method in which the control valve 24 was closed but the control valve 21 was opened. FIG. 4 illustrate temperature variations during the 10-hrs operations. In the Comparative Experiment, the temperature varied considerably. When the temperature was low, i.e, the pressure was low, it was difficult to discharge the slurry from the polymerization tank. When the temperature, i.e., the pressure was high on the other hand, more slurry was discharged. It was hence difficult to maintain the volume of the slurry at the constant level. Moreover, the stereoregularity of the resultant polypropylene was poor.

In the present Example, the control of the control valves 21,22,24 in accordance with detected temperatures were effected in the following manner.

A polymerization tank temperature, which had been detected by the thermometer 31, was controlled with a preset temperature of 70° C. at the controller 32. The opening degree of the control valve 24 was reduced further when the above-detected temperature was higher than the preset temperature and the rate of variation of the polymerization tank temperature is not greater than a threshold. When the rate of variation of the polymerization tank temperature was greater than the above threshold on the other hand, the opening degree of the control valve 22 was increased and that of the control valve 24 was also controlled.

When the polymerization tank temperature was lower than the preset temperature on the other hand, the respective control valves were operated in a manner opposite to the above-described manner.

In addition, the stability of the control system was enhanced by feedback-controlling the control valve 21 in accordance with a function of the rate of temperature changes upon processing the rate of each change of the polymerization tank temperature at the controller 32.

EXAMPLE 3

The procedure of Example 2 was repeated except that the hydrogen concentration was increased to 15%. Since the controllability was slightly poor, the valve 24 was closed and the valves 21,23 were controlled in a manner interlocked with the valve 22.

Namely, a polymerization tank temperature, which had been detected by the thermometer 31, was controlled with a preset temperature of 70° C. at the controller 32. When the above-detected temperature was higher than the preset temperature and the rate of variation of the polymerization tank temperature is not greater than a threshold, the opening degree of the control valve 22 was not changed, the opening degree of the control valve 23 was reduced further, and the opening degree of the valve 21 was increased further in a manner interlocked with the valve 23. When the polymerization tank temperature was lower than the preset temperature on the other hand, the respective control valves were operated in a manner opposite to the above-described manner. In the above-described manner, it was possible to continue the polymerization reaction at the constant temperature with good controllability.

What is claimed is:

1. A method for controlling the polymerization temperature in a polymerization apparatus equipped with a cooling system, wherein steam is produced in the presence of a volatile liquid medium and a non-condensible gas in a reaction system, which comprises:
    (a) condensing the steam in a reflux condenser, and returning said condensate and a portion of the non-condensed gas to the reaction system;
    (b) compressing and recirculating the remaining portion of said non-condensed gas to said cooling system; and
    (c) controlling the flow rate of said recirculated non-condensed gas and of a cooling medium introduced into said reflux condenser in accordance with the temperature of the reaction system, thereby removing polymerization heat.

2. The method as claimed in claim 1, wherein said portion of the non-condensed gas is returned to a non-condensed gas discharge line extending from the reflux condenser of the cooling system so as to recirculate the same.

3. The method as claimed in claim 1, wherein said remaining portion of said non-condensed gas is recirculated by returning the same to said reflux condenser of the cooling system through an introduction line thereto and to a non-condensed gas discharge line extending from said reflux condenser, and wherein at least one of the flow rates of said recirculated portion of said non-condensed gas and said cooling medium is controlled.

4. The medium as claimed in claim 1, wherein the volatile liquid medium is monomer to be polymerized.

* * * * *